Aug. 10, 1948.          H. K. FLINCHBAUGH          2,446,645
                         POWER TRANSMISSION UNIT
Filed Feb. 15, 1946                              4 Sheets—Sheet 4
*FIG_13_* 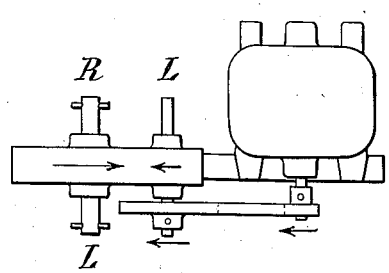
*FIG_14_* 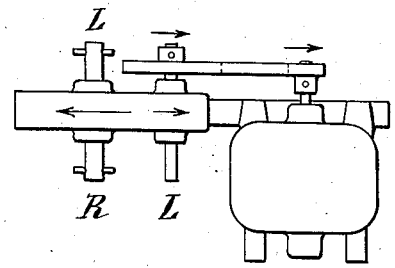
*FIG_15_* 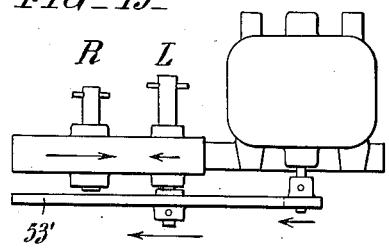
*FIG_16_* 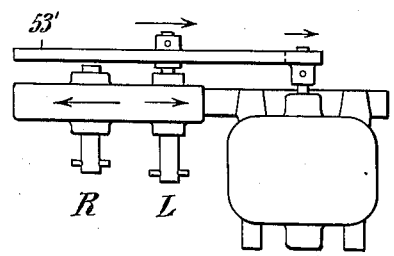
*FIG_17_*
*FIG_19_* 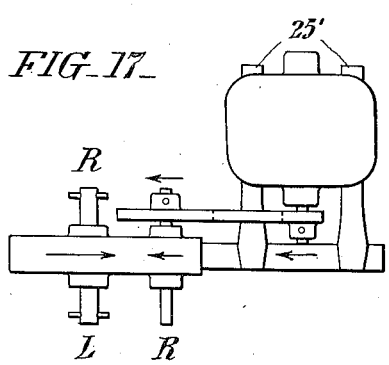
*FIG_18_*
*FIG_20_* 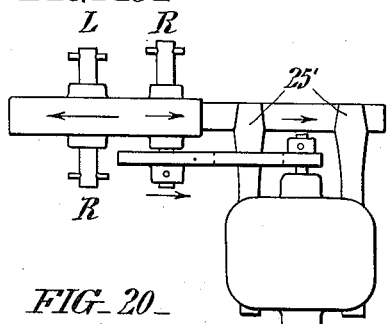
WITNESSES
Hubert Fuchs
Evalyn L. Fullerton
INVENTOR:
Henry K. Flinchbaugh,
BY Paul & Paul
ATTORNEYS.

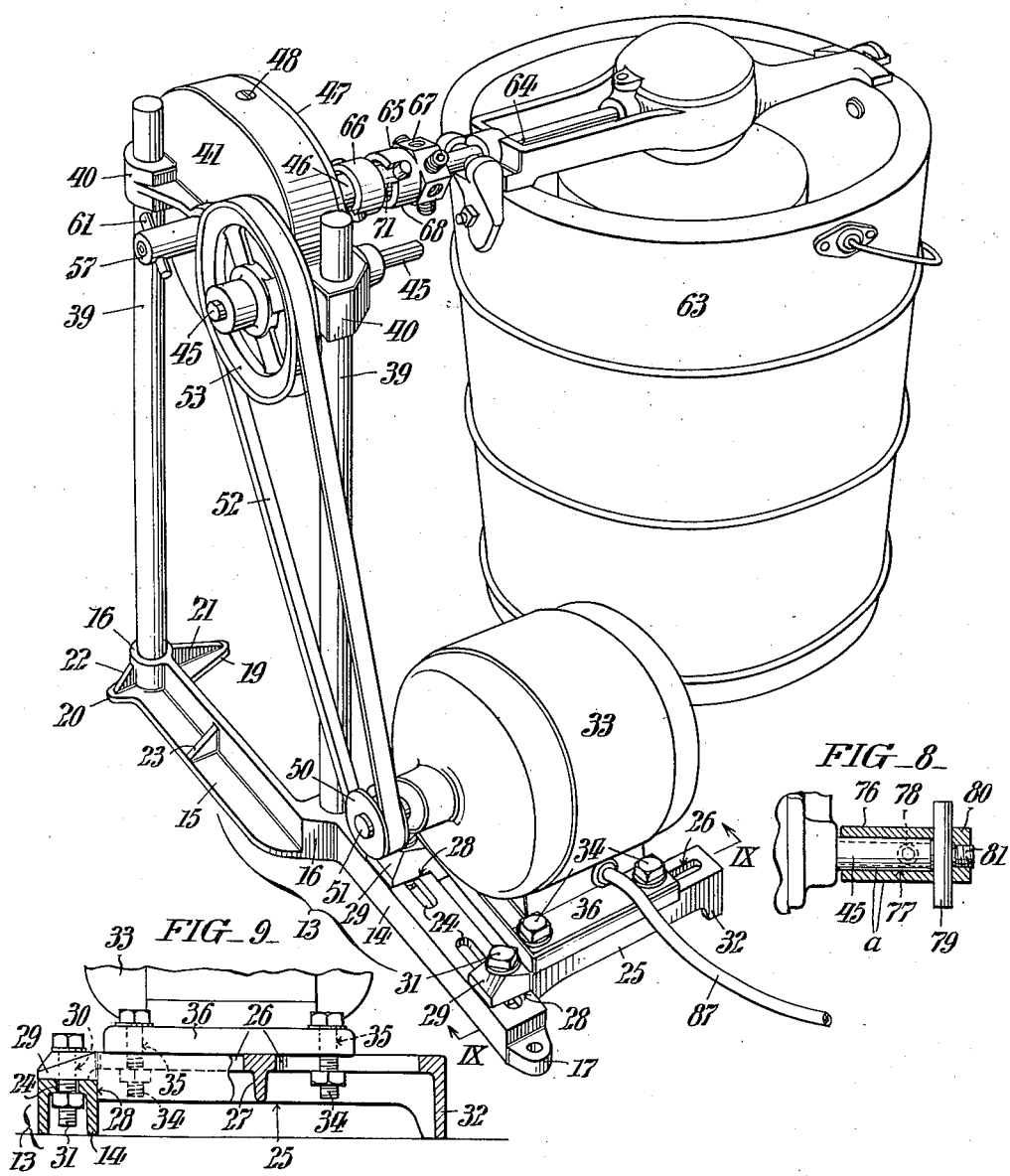

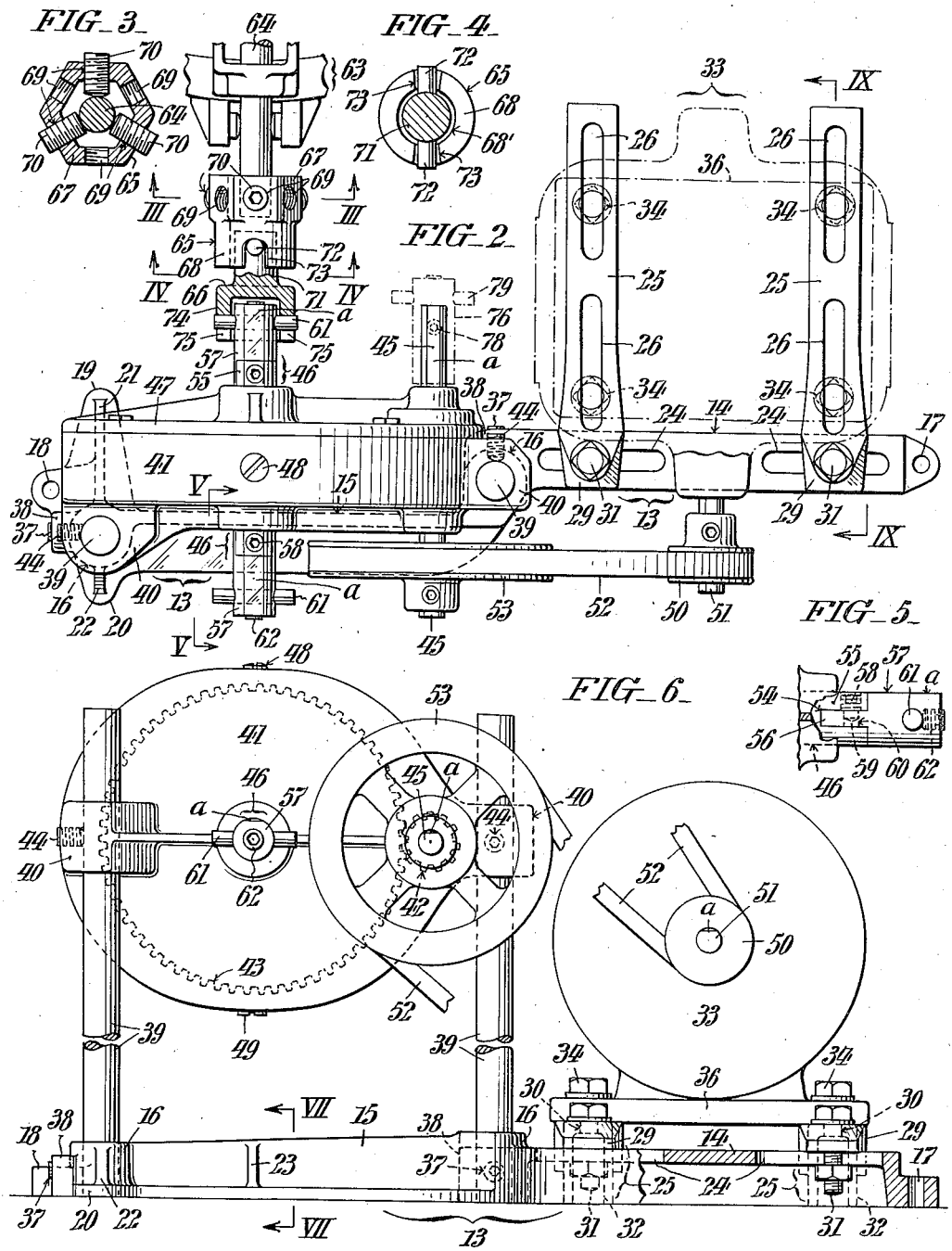

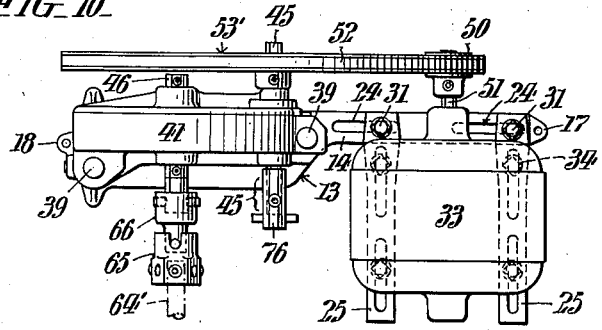
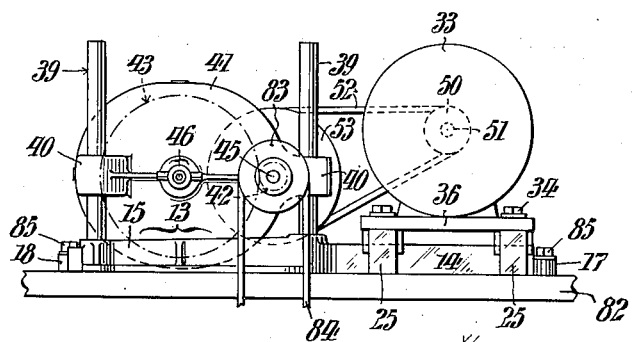
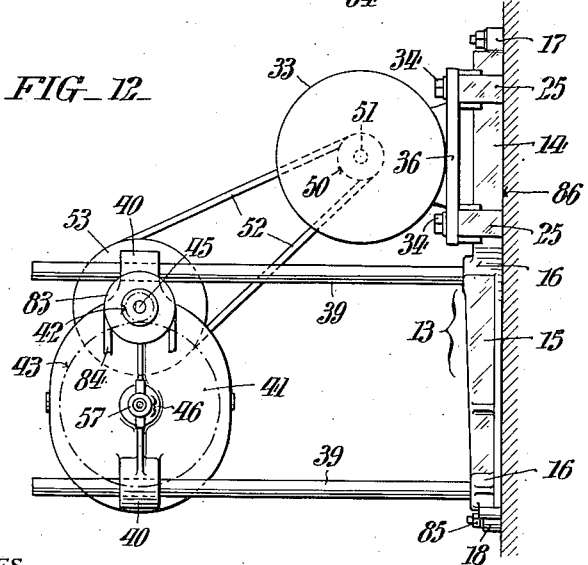

Patented Aug. 10, 1948

2,446,645

UNITED STATES PATENT OFFICE 2,446,645

POWER TRANSMISSION UNIT

Henry K. Flinchbaugh, York, Pa.

Application February 15, 1946, Serial No. 647,857

12 Claims. (Cl. 74—16)

This invention has general reference to power-transmission units while it relates, more particularly, to the species thereof preferably designed to serve as speed-reduction units which may be conveniently termed as self-contained.

Fundamentally the instant invention aims to provide a transmission unit which can be used or installed, in any suitable location or position, with pre-assurance that the power transmitted, when directly coupled, will be effective irrespective of accurate alignment between the driving and driven members or shafts.

Another aim of this invention is to provide a speed-reduction unit of the above indicated type, for operating equipment, apparatus and utilities, which is readily adjustable according to the location of the shaft to be driven, and for the almost unlimited transmission of power in any selected direction, and whereby a much wider range of speed reduction as well as multiple-transmissions can be obtained, than heretofore, by utilizing both ends of the input and/or both ends of the out-put shafts, as plain shafts for direct application thereto of drive pulleys, gears, sprockets, and flexible shaft coupler means.

A further aim of this invention involves the provision of a speed reduction unit, of the species above referred to, including adapter-coupling means which is readily adjustable to accommodate differing cross-sections of equipment or apparatus shafts, to be operated thereby, with an incidental saving of time and labor in making the connection.

A still further aim of this invention is the provision of a novel speed-reducing power-transmission unit designed for association, preferably, with a small or fractional-horsepower electric or other convenient type motor, which can readily be placed for right or left-hand driving.

While the foregoing definitions are indicative in a general way of the aims of this invention, others with ancillary advantages will be evident to those skilled in the art upon a full understanding of the construction, arrangement and operation of the means hereafter fully disclosed, but it will also be appreciated that said invention is susceptible of other embodiments, or structurally modified forms, coming equally within the terms and scope of the concluding claims.

In the accompanying sheets of drawings:

Fig. 1, Sheet 1, is a perspective view of one practical embodiment of this invention as adapted for operating a conventional type "bucket-freezer," for example only, such as is frequently used on farms and in many country homes.

Fig. 2, Sheet 2, is a plan view of the improved speed reducing power transmission unit with a portion of the novel adapter-coupler means in section for the purpose of clarifying structural details, and the associated small electric motor indicated by dot-and-dash outline, in order that the mounting elements therefor may be better viewed and understood.

Fig. 3 is a detail section on the plane of the angled arrows III—III in Fig. 2.

Fig. 4 is a similar section taken on the plane IV—IV of Fig. 2.

Fig. 5 is a section taken approximately as indicated by the relatively staggered arrows V—V in Fig. 2.

Fig. 6 is a broken elevation of the unit as viewed looking upwardly from below Fig. 2, with a portion at the lower right-hand thereof in section.

Fig. 7 is a fragmentary section taken as indicated by the angled arrows VII—VII in Fig. 6.

Fig. 8, Sheet 1, is a part section and part elevation of an alternative form of fitting for application to the end of the input shaft of the speed-reduction unit, and which is hereinafter fully described.

Fig. 9, Sheet 1, is a section taken approximately as indicated by the angled arrows IX—IX in Figs. 1 and 2.

Fig. 10, Sheet 3, is a smaller scale plan view of a modified form of the invention as adapted for effecting a greater range of speed reduction.

Fig. 11 is a side elevation along the lines of Fig. 6, drawn to a smaller scale, illustrating how the speed-reduction unit of this invention may be adjusted down to floor level.

Fig. 12 illustrates how the speed-reduction unit, of this invention, is readily adapted for attachment to a wall or other vertical surface; and, Figs. 13 to 20 inclusive are diagrammatic views illustrating the extensive and differential drives which may be effected by the means of this invention.

In describing the forms of this invention exemplified, in the drawings herewith, specific terms will be employed for the sake of clarity, but it is to be expressly understood the scope of said invention is not thereby limited; as each such term is intended to embrace all reasonable equivalents which perform the same function for an analogous purpose.

Referring first with greater particularity to Figs. 1–9 it will be seen that the embodiment therein illustrated comprises a main base member comprehensively designated 13, the same embodying an inverted channel-portion 14 with a disaligned or relatively parallel angle-section extension 15, said extension having socket enlargements 16 at the respective ends thereof. It is also to be noted that the channel-portion 14 is provided at its outer end with an apertured lug 17; and that the corresponding end of the extension 15 is formed with a similar lug 18 and laterally-projecting foot-pieces 19, 20 preferably having vertically-directed reinforcements 21, 22 respectively, in order to stabilize the unit in assembly. 23 is a similar reinforcement intermediate the ends of the angle-section extension 15; while 24 are spacedly aligned slots in the web of the channel portion 14 of the base member 13, and the purpose whereof is hereafter set forth.

In connection with the main base 13 I provide a pair of spaced motor mounting elements 25, each of which is preferably of inverted channel-section and formed with spacedly-aligned slots 26 in the web portion thereof with an intervening reinforcing rib 27, Fig. 9. It is also to be observed that one end of each mounting element 25 is formed with an angled under-cut 28 to define a bearer-lug 29, said lug 29 having an aperture 30, see Figs. 6 and 9, for passage of a clamp bolt 31 which also is engaged through an associated base member slot 24; whereas the vertical portion of the under-cut 28 provides an abutment for coaction with the confronting outer face of the main base member channel portion 14, when the bolt 31 is inserted and tightened up, whereby the base member 14 and mounting elements 25, when assembled, are located at right angles to the base 13 and firmly held in place. It is further noticeable that the end of each mounting element 25, remote from the lug 29, is downwardly extended to provide a foot-piece 32, Figs. 1 and 9; whereas it is to be expressly understood that by forming the elements 25 each with an end lug 29 and foot-piece 32 provision is made for the use of a right or left-hand motor 33, by making it possible for the mounting element 25 to be attached to either longitudinal side of the main base member portion 14 regardless of the motor direction, or the direction required at the point of power take-off from the transmission unit. Incidentally, the motor 33, is securely fixed on the mounting elements 25 by hold-down bolts 34, with passage through the conventional holes 35 in the base 36 thereof and the slots 26 in an obvious manner, as best understood from Fig. 9; while it is to be particularly noted said motor 33 is accorded a substantial degree of axial adjustment by aid of said slots 26, for reasons later on again referred to.

Rigidly secured in the socket enlargements 16, as by headless or safety set-screws 37 engaged through embossments 38, are a pair of dis-aligned and readily substitutable posts 39, of any appropriate length, having passage through laterally projecting apertured lugs 40 integral with a casing 41 which houses the speed-reducing transmission-gears 42, 43, Fig. 6, while said casing is secured at the desired elevation by headless set-screws 44. The smaller gear or pinion 42 is made fast to the counter or in-put shaft 45, and the larger gear 43 is similarly secured on the driver or out-put shaft 46; while the casing 41 is closed in, with an appropriate sealing joint, by a suitable cover 47. This casing 41, it is to be remarked, fully encloses the transmission gears 42, 43, which, obviously, may be of any requisite ratio, so that said gears may rotate in oil, for example; and said casing is provided with removable set-screws 48, 49 respectively for filling and drain-off purposes, as readily understood by those conversant with the art.

For operatively coordinating the motor 33 to the in-put shaft 45 of the transmission unit, above described, use is conveniently, although not essentially, made of a comparatively small groove-pulley 50 on the shaft 51 of said motor and an elastic or flexible drive 52, in turn trained about a substantially larger groove pulley 53, made fast on the outer projecting end of the in-put shaft 45 of the transmission unit. Obviously, any other appropriate coordinating means may be used between the motor shaft 51 and the in-put shaft 45, as is deemed desirable or expedient.

In order to make provision for almost unlimited speed reduction being effected, through the means of this invention, by the simple expedient of substituting a larger pulley—for the pulley 53—on the in-put shaft 45, and to facilitate ready coupling of the novel speed-reduction power transmission unit to differing equipment or apparatus to be operated thereby, use is preferably made of the adjunctive means now to be described.

Referring to Figs. 1–5 inclusive, and first to Fig. 5 more particularly, it will be seen that each projecting end of the out-put shaft 46 is provided with a diametric slot or cut-out 54 defining a clevis 55, for snug reception of a correspondingly-sectioned tongue 56, projecting from one end of an adapter extension 57. The parts 46 and 57 are alignedly connected by means of a headless set-screw 58 threaded through one side of the clevis 55, said screw having a diametrically reduced end 59 engageable in a hole 60 provided for the purpose in the tongue 56 and whereby the parts 46, 57 are axially aligned. The other or outer closed-in end of the adapter 57 is fitted with a diametric driving-pin 61 rigidly held in place by an axially located headless set-screw 62 threaded into said end of the adapter 57. This manner of connecting the shaft 46 and extension 57 is shown as an example only, as the ends of the shaft 46 may be left plain, when it is desirable to use a pulley, such as 53 of a diameter that does not project up to or beyond the projecting end of the shaft 46.

In order to effect easy coupling connection between the out-put shaft 46 and a piece of equipment or apparatus such, for example only, as the conventional freezer 63 shown in Fig. 1, the operating shaft 64 of the latter has attachable thereto a novel form of adapter-coupling means. This adapter-coupling means, as best understood from Figs. 2, 3 and 4, conveniently, although not essentially, comprises two components 65, 66, the former 65 of which is in the form of a double-socketed adapter, one portion 67 whereof being preferably of hollow polygonal cross-section and the other 68 cylindrical. As shown, the portion 67 is hexagonal exteriorly as well as internally and it is conveniently provided in each of the flat walls with a screw-threaded hole 69 into, alternate of which for instance, is inserted an adjuster or headless set-screw 70, whereby said adapter is securely fixable concentrically aligned on the outer end of the freezer operating-shaft 64, in an obvious manner. It is also to be particularly noted that by making the adapter portion 67, as just explained, it can be alignedly-mounted concentric with the axis of any section shaft-end insertible within the confines of the bore limits thereof.

The coupler component 66 embodies a stem portion 71 having clearance in the bore 68′, Fig. 4, of the adapter portion 65 and a driver-pin 72, proximate the outer end thereof, for free engagement in opposed longitudinal or open end slots 73 of the socketed confronting end 68 of said adapter 65; and a socket extension 74 having opposed similar end slots 75 for similar inter-connection with the driver pin 61 of the out-put shaft adapter 57, as readily understood on examination of Fig. 2, more particularly. Attention is here directed to the fact that the respective driver-pins 72 and 61 are directed in planes at right angles to one another, whereby there is provided, what may be termed, a double or universal-joint structure, said structure including male and female ends, which prevent interference with the effective driving action, should the out-put shaft 46 of the power transmission unit not be in direct alignment with the operating shaft 64 of the freezer 63, or other appliance to be actuated thereby; and to more positively ensure the effective action just explained, the respective sides of the open-end slots 73 and 75 are respectively tapered outward, as best shown in Fig. 4. Obviously the shafts 46, 45, and adapter 76 can be used as plain shaft ends by removing the respective driving pins 61, 79; and by providing the parts 46, 45 and 76 with a lengthwise flat $a$ as conventionally indicated in Figs. 2, 6 and 8, for engagement by the fastening means of the part applied thereon as readily understood by those conversant with the art.

In Figs. 1, 2 and 6, the motor 33 with the mountings 25 are shown as located to the right-hand of the power transmission unit base member 13, and reference is now made to Fig. 10 which illustrates how readily said parts can be positioned to the left-hand thereof; accordingly corresponding general references are applied with the following explanatory comments. In the first place it is to be noted that the right-hand mounting element 25 has its bearer-lug 29 and clamp-bolt 31 moved to nearly the outer limit of the associated slot 24 of the base member 13, so that the motor 33 is positioned to permit use of a much larger or maximum sized pulley 53' on the in-put shaft 45 of the transmission 42, 43, whereby the speed of said transmission is considerably reduced. It is further to be noted that the pulley 53 is located on the reverse end of the in-put shaft 45, to the showing in Figs. 1 and 3; while the adapter 57 has been removed from the corresponding end of the out-put shaft 46 so as to enable use of the desired larger diameter pulley 53; while the combination adapter-coupler means 65, 66 is transferred to the same side of the housing 41 as the motor 33 occupies.

In order that more than one appliance or the like may be concurrently operated at different speeds by the improved power transmission unit, of this invention, there is provided an adjunctive adapter 76, such as shown to best advantage in Fig. 8, Sheet 1, for application to the normally free end of the in-put shaft 45. This adapter 76 preferably comprises a cylindrical body having a bore 77 for snug engagement on the shaft 45 and to be secured thereto by a headless set-screw 78, while its outer end is closed in at 80; and, in addition thereto said adapter is fitted with a diametric driver-pin 79 held in place by a similar set-screw 81, in an obvious manner. Now it will be clearly apparent that an adapter-coupler means 65, 66 may be applied to the adapter 76, and the associated equipment or apparatus operated at the speed transmitted by the in-put shaft 45; while the out-put shaft 46 is ready to drive another piece of equipment or apparatus at the lowest rate of speed, as hereinbefore set forth.

Fig. 11 shows how the transmission 42, 43 and casing 41 may be lowered on the posts 39 to the low level of the main base member 13, or into proximity with a bench, shelf or other support 82, on which the unit may be set up or installed. In other words the casing 41 is located in a plane below that of the axis of the motor shaft 51; and, incidentally such placement of said casing 41 is rendered possible by the offsetting of the angle-section portion 15 of the base member 13, relative to the channeled portion 14, as clearly understandable from Figs. 1 and 11. Fig. 11 also illustrates how an additional pulley, sprocket or the like 83 and associated drive 84 may be applied to the in-put shaft 45, for operating a piece of equipment at a relatively lower, or other, level than that occupied by the transmission unit of this invention; while securing means 85 engaged through the base member apertured lugs 17, 18 indicate how the unit is attachable to a bench or other support 82.

Fig. 12 shows how the means, of this invention, may be attached to a wall 86, or other vertical support, accordingly like reference characters to those previously used are applied, in order to obviate the necessity for needless repetitive explanation, while note is to be had of the fact that the gearing casing supports 39 are horizontally directed which materially expands the possible power take-off capacity of the unit.

Having described the structural features and varying adaptability thereof the operation of the speed-reducing power-transmission unit is briefly as follows: Assuming electric current is supplied to the motor 33 by aid of a suitable conductor 87, Fig. 1, it will be readily understood that as rotary motion is imparted to its shaft 51, the pulley 50 will be correspondingly activated, and, by the flexible drive 52 and pulley 53 impart rotation, at a much reduced speed, to the in-put shaft 45. This shaft 45 will in turn, through the pinion 42 and gear 43 transmit further reduced rotary motion to the out-put shaft 46, with resultant operation of the equipment or other apparatus, such as the freezer 63, through the adapter-coupler means 65, 66; or, when appliances are coupled up to the adjunctive adapter 76, or to the pulley and drive 83, 84, Fig. 11, on the in-put shaft, the corresponding operation of such appliances will be self-evident without further elaboration thereof herein.

Figs. 13 to 16 illustrate different set-ups for mounting the transmission which will suit most or normal cases for use in regard to the direction of drive for the accessories to be operated, while Figs. 17 to 20 show how by employing slightly longer motor mounting 25', and keeping the transmission on the side of the housing 41 towards the motor; approximately all desirable directions of drive can be accomplished and different conditions with respect to size and location of the equipment to be driven readily accommodated. The references R and L indicate with associated arrows the differing directions of rotation of the motor and equipment operated thereby.

From the foregoing it is thought the merits of this invention will be clearly apparent but it is desired to herein emphasize certain inherent advantages. The speed-reducing power-transmission capacity is substantially unlimited, inasmuch as the gear reduction 42, 43, as well as the power transmission 50, 52, 53 from the motor 33 can be of any desirable or required ratio, or said means adjusted to any convenient elevation relative to the base level which is limited only by the length of the posts 39 used; whereas the unit can be readily changed for right or left-hand set-up with corresponding variability and/or differential power take-off from the out-put shaft 46, as well as the in-put shaft 45. It is further noteworthy that the main base channel-portion 14, for adjustable attachment thereto of the motor mounting elements 25, is in a plane central with the length, and at a right angle to the axis, of the in-put shaft 45 of the gear transmission 42, 43 thus facilitating accurate location of the said elements 25 for right or left-hand placement of the motor 33. The aligned slots 24 in the base member 13 provide for planar adjustment of the motor base 36 as desirable; whereas the mountings 25 having aligned slots afford adjustment to accommodate a wide range of variation in the position of the motor base holes 35. Right or left-hand mounting of the motor 33 enables a reversible direction of rotation for said motor, as well as providing a right or left-hand power-transmission unit regardless of the direction of motor rotation, or the direction of rotation required for the equipment or apparatus operating-shaft 64. Furthermore, providing the improved power transmission unit with the adapter-coupler means 65, 66 eliminates the need for any special adapter or special coupling, and enables quick connection of said unit to any piece of equipment or apparatus to be operated thereby; while by virtue of the means 65, 66, embodying the double-joint 61, 72, it is unnecessary to have perfect alignment between the shafts 46 and 64, as will be quite obvious to those conversant with the art.

While the invention has been described more or less in detail, it is obvious that changes will be made, or suggest themselves to those conversant with the art, in adapting said invention for other than conventional usage; but all such improvements are contemplated as falling within the scope of the following claims.

Having thus described my invention, I claim:

1. In a motor operable power-transmission speed-reducing unit having in-put and out-put shafts, a base embodying sections for the respective adjustable support of the speed reducing unit and the motor, said sections running in one direction but offset from each other; spaced members removably attached to one section of the base, said members jointly affording variable support for the speed-reducing unit with its in-put and out-put shafts, both of said shafts having outward projection to each side of said unit and at an equal distance from the center of the unit supporting base; adjustable motor-mountings, flankingly connectable to either side of the other section of the base, for the adjustable seating thereon of the motor; drive means adapted to operatively connect the motor-shaft to either side of the speed-reducer in-put shaft; and adapter-couplings on the projecting ends of the out-put shaft and on one end of the in-put shaft of the speed-reducing unit for inter-connection with the equipment or apparatus to be operated thereby.

2. In a motor operable power-transmission speed-reducing unit having in-put and out-put shafts, a base embodying sections for the respective adjustable support of the speed-reducing unit and the motor, said sections being relatively offset but directionally in parallel; spaced members removably attached to one section of the base, said members jointly affording variable vertical support for the speed-reducing unit with its in-put and out-put shafts, both of said shafts having outwardly projecting ends to each side of said unit and at an equal distance from the center of the unit supporting base; adjustable motor-mountings, flankingly connectable at equal angles to either side of the other section of the base, for the adjustable seating thereon of the motor; a speed-reducing drive adapted to operatively connect the motor-shaft to either side of the speed-reducer in-put shaft; and adapter-couplings on the projecting ends of the out-put shaft and on one end of the in-put shaft of the speed-reducer for interconnection with the equipment or apparatus to be operated thereby.

3. In a motor operable power-transmission speed-reducing unit having in-put and out-put shafts, a base embodying sections for the respective adjustable support of the speed-reducing unit and the motor, said sections being relatively offset but directionally in parallel; spaced members removably attached to one section of the base, said members jointly affording variable vertical support for the speed-reducing unit with its in-put and out-put shafts, both of said shafts having outward projecting ends to each side of said unit and at an equal distance from the center of the unit supporting base; and said in-put and out-put shaft projecting ends being adapted for attachment thereto of driving means or shaft couplers; adjustable motor-mountings, flankingly connectable at right angles to either side of the other section of the base, for the adjustable attachment thereon of the motor; a speed-reducing drive adapted to operatively connect the motor shaft to either side of the speed-reducer in-put shaft; an adapter-coupler for quick connection between the selected shaft-end coupler and the drive-shaft of the equipment or apparatus to be operated by the speed-reducing unit; and said adapter including a socket with attaching means whereby it is concentrically securable to any section shaft-end insertable within the bore limits of said socket.

4. A power-transmission speed-reducing unit in accordance with claim 3 wherein the base includes an inverted channel-section with a disaligned angle-section extension; and wherein said extension enables adjustment of the speed-reducer to the low level of its capacity for vertical support.

5. A power-transmission speed-reducing unit in accordance with claim 3 wherein the base includes an inverted channel-section with an angle-section extension, both linearly in one direction but relatively offset; wherein the channel-section has spacedly aligned slots in its web portion; wherein socket portions are provided at the ends of the angle-section extension; wherein the base aforesaid has apertured attachment lugs at the respective ends thereof; and wherein the angle-section extension embodies laterally projecting foot-pieces.

6. A power-transmission speed-reducing unit in accordance with claim 3 wherein the angle-section extension of the base embodies relatively offset end socket-portions; wherein the spaced members affording variable support for the speed-reducer are in the form of substitutable posts securable in said socket-portions; wherein the speed-reducer is provided with apertured projecting lugs for movable fixture on said substitutable posts; and wherein the speed-reducer projecting lugs include means for securing said reducer at the desired spacial adjustment relative to the base of the unit.

7. A power-transmission speed-reducing unit in accordance with claim 3 wherein each adjustable motor-mounting element is of inverted channel-section having spacedly aligned slots in its web portion with an intervening reinforcing rib; and wherein said element is provided at one end with an apertured bearer-lug for engagement on the base motor-supporting section at either side, whereby provision is made for adjustable planar-attachment thereto of motor bases of different sizes.

8. A power-transmission speed-reducing unit in accordance with claim 3 wherein each projecting end of the speed-reducer out-put shaft embodies a clevis; wherein an adapter having a tongue-extension is removably secured to said clevis; wherein a driving pin is releasably secured diametrically through the outer end portion of said adapter; and wherein said clevis, adapter tongue extension and the driving pin are connected in assembly by headless securing means, for ready coupling to individually associated equipment or apparatus.

9. A power-transmission speed-reducing unit in accordance with claim 3 wherein an adjunctive adapter engages one end of the speed-reducer in-put shaft, said adapter consisting of a cylindrical body having the outer end closed-in; wherein the bore of the adapter fits snugly on the shaft end; wherein a diametrically projecting driver-pin is engaged through the adapter adjoining the closed-in end thereof; and wherein headless set-screws respectively attach the adapter to the shaft end and hold the driver-pin securely against axial displacement, whereby an additional piece of equipment or apparatus may be concurrently operated, with that or those motivated by the out-put shaft of the reducer, and at a differential rate of speed.

10. A power-transmission speed-reducing unit in accordance with claim 3 wherein the special adapter-coupler comprises a double-socketed component for attachment to the equipment or apparatus operating-shaft; wherein an axially related semi-interconnected component is also adapted for slip-on engagement with the confronting end of the speed-reducer out-put shaft; and wherein angularly-related pin and slot means between said respective components enable effective driving of the equipment or apparatus operating-shaft regardless of misalignment between said operating-shaft and the out-put shaft of the speed-reducer.

11. An adapter-coupling for power-transmission speed-reducing units as defined in claim 3, wherein the adapter is in the form of an axially double-socketed component, one portion of such component being of hollow polygonal cross-section and the other of hollow cylindrical formation; wherein the walls of the polygonal portion are each provided with a screw-threaded aperture, for relatively alternating engagement therein of headless screws, and opposed longitudinal open-end slots are formed in the cylindrical portion; wherein the coupling embodies a stem portion with an axially-aligned socket portion; wherein the coupling stem portion is freely insertable in the cylindrically socketed end of the adapter and includes a diametrically projecting driver-pin, for engagement with the adapter open-ended slots; wherein the coupling socket portion is provided with open end slots for rectangularly-related coaction with the driver-pin of the speed-reducer out-put shaft; and wherein the sides of the respective open-ended slots in the adapter and coupling are tapered outwards, for the purpose specified.

12. The invention of claim 3 wherein the speed-reducer consists of proportionate tooth gears; wherein the drive intermediate the motor and the in-put shaft comprises large and small diameter groove pulleys respectively; and wherein said pulleys are operatively coordinated by a flexible drive.

HENRY K. FLINCHBAUGH.

REFERENCES CITED

The following references are of record in the file of this patent:

UNITED STATES PATENTS

| Number | Name | Date |
| --- | --- | --- |
| 1,550,414 | Anderson | Aug. 18, 1925 |
| 1,674,302 | Royle | June 19, 1928 |
| 2,028,282 | Hoe | Jan. 21, 1936 |
| 2,368,731 | Snyder | Feb. 6, 1945 |